United States Patent
Lin et al.

(10) Patent No.: US 6,398,936 B1
(45) Date of Patent: Jun. 4, 2002

(54) PROCESS AND APPARATUS FOR PLATING COPPER ON PARTICULATE GRAPHITE

(76) Inventors: Ching-Bin Lin, 2F-2, No. 12, Lane 88, Min-Sheng E. Road, Sec. 3, Taipei (TW), 104; Jen-Fin Lin, No. 25, Lane 6, Chung-Teh 2nd Street, Tainan (TW)

(*) Notice: Subject to any disclaimer, the term of this patent is extended or adjusted under 35 U.S.C. 154(b) by 57 days.

(21) Appl. No.: 09/589,177

(22) Filed: Jun. 5, 2000

(51) Int. Cl.⁷ .................................................. B05D 1/18

(52) U.S. Cl. .......................... 205/85; 205/93; 427/443.2

(58) Field of Search .................................. 205/205, 144, 205/220, 291, 85, 93; 427/212, 443.2, 443.1, 430.1

(56) References Cited

U.S. PATENT DOCUMENTS 4,622,109 A * 11/1986 Puppolo ....................... 205/85

* cited by examiner

Primary Examiner—Donald R. Valentine
Assistant Examiner—Thao Tran

(57) ABSTRACT

A process for plating copper on particulate graphite comprises cleaning and drying the graphite particles; wetting the graphite particles with an aqueous solution of cupric sulfate and glacial acetic acid; dripping the graphite particles as wetted with a layer of the aqueous solution on a rotating metal (including zinc, aluminum and iron) disk to conduct a displacement reaction to plate copper, as displaced by the metal existing in situ on the metal disk, on each graphite particle; and washing the graphite particles as plated by copper with water and then drying the copper-plated graphite particles.

6 Claims, 4 Drawing Sheets

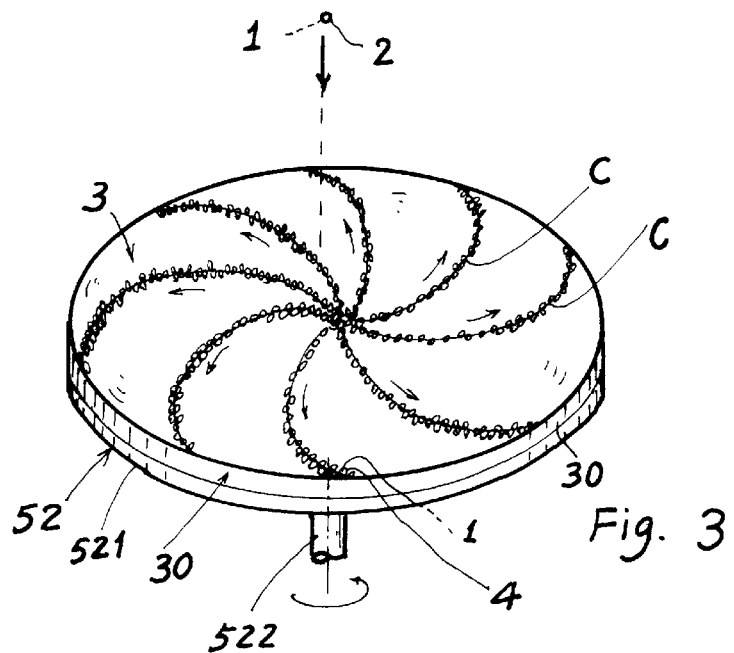
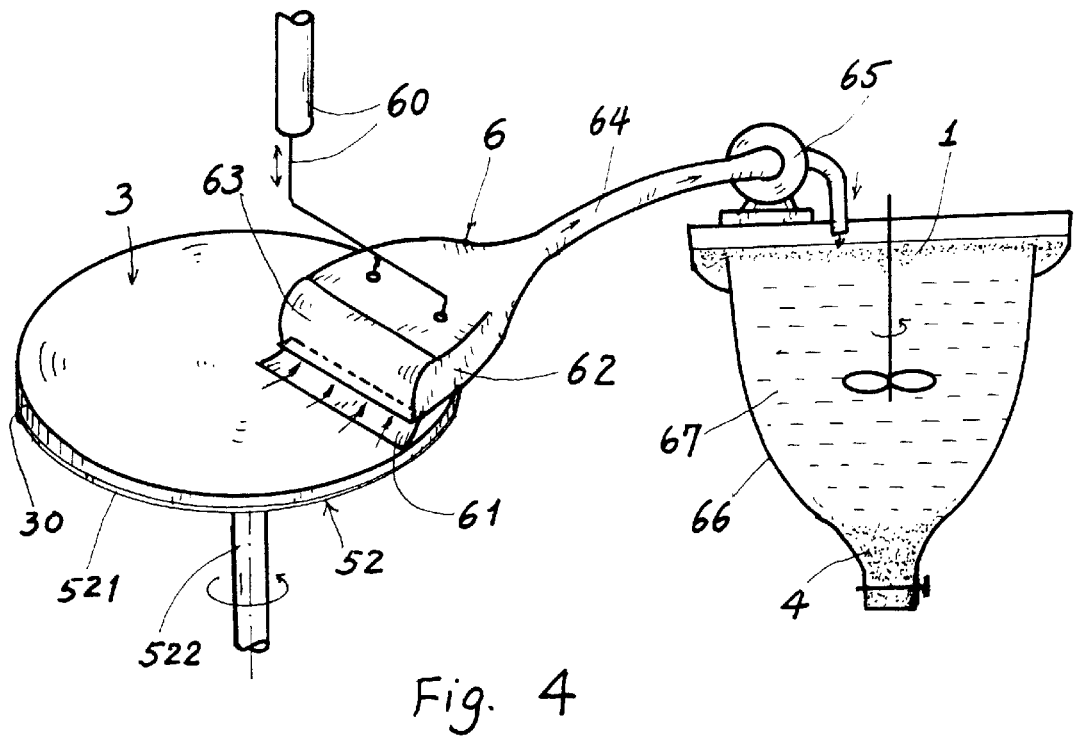

PROCESS AND APPARATUS FOR PLATING COPPER ON PARTICULATE GRAPHITE

BACKGROUND OF THE INVENTION

Graphite is a good solid lubricating material. It is known that a powder metallurgy product by plating copper or sliver on graphite particles will have a good property for abrasion resistance and self-lubrication.

U.S. Pat. No. 4,240,830 disclosed a process (hereinafter called as "prior process") for plating copper or silver on graphite particles as small as 38 microns. In this prior process, the preparation of the graphite powders includes heat treatment in a hydrogen atmosphere up to 1000° C., and the graphite powder is then sensitized in a stannous-stannic chloride solution and when copper plating is undertaken, activation by contact with a silver nitrate solution is carried out. The prior process is complicated with high production cost, and should be subjected to hydrogen atmosphere at high temperature. Hydrogen has an ignition temperature of 1085° F. (585° C.) and a flammable limit of 4.0~75% by volume in air. So, it should be very careful to treat the dangerous and easily explosive hydrogen under high temperature, thereby requiring strictly controlled working environment, process equipments, and operation management and possibly increasing the production cost.

The present inventor has found the drawbacks of the prior process for plating copper on graphite particles, and invented a process and apparatus for plating copper on particulate graphite safely and economically.

SUMMARY OF THE INVENTION

The object of the present invention is to provide a process for plating copper on particulate graphite comprising the steps of:
1. Cleaning and drying the graphite particles;
2. Preparing a plating solution including aqueous solution of cupric sulfate and glacial acetic acid; and agitating the plating solution with the graphite particles as cleaned for circumferentially wetting the aqueous solution of cupric sulfate on the graphite particles;
3. Dripping the graphite particles as wetted with a layer of the aqueous solution of cupric sulfate on a rotating metal (including zinc, aluminum and iron) disk to conduct a displacement reaction within the layer of the cupric sulfate solution to plate copper, as displaced by the metal existing in situ on the metal disk, on each graphite particle; and
4. Washing the graphite particles as plated by copper with water and then drying the copper-plated graphite particles.

Another object of the present invention is to provide an apparatus for plating copper on the graphite particles with a safe and economic process.

BRIEF DESCRIPTION OF THE DRAWINGS

FIG. 3 is a perspective view of the rotating metal disk for conducting the displacement reaction thereon for plating copper on the graphite particles.

FIG. 4 shows a scraping means for removing copper film as deposited on the rotating metal disk of the present invention.

DETAILED DESCRIPTION

The process for plating copper on particulate graphite comprises the steps of:
1. Cleaning and Drying the Graphite Particles:

The graphite particles (each having an average size of 15 microns) are soaked in a solvent, for instance, an acetone solvent, and cleaned as oscillated by ultrasonic waves. Then, the graphite particles are dried.

2. Preparing an Aqueous Solution of Cupric Sulfate and Wetting the Cupric Sulfate Solution on the Graphite Particles:

An aqueous solution of cupric sulfate is prepared by mixing one portion of cupric sulfate containing 5 moles of crystalline water ($CuSO_4.5H_2O$) with three portions of deionized water.

Glacial acetic acid is added into the aqueous solution of cupric sulfate. The adding ratio of acetic acid is 0.25 ml glacial acetic acid per gram of graphite. The mixing solution of cupric sulfate, glacial acetic acid and graphite particles are agitated by using the apparatus 5 as shown in FIG. 2 for circumferentially wetting each graphite particle 1 with a layer of aqueous solution of cupric sulfate 2. The glacial acetic acid is added into the solution to help wet the graphite particles in order to efficiently wet or coat the layer of aqueous solution of cupric sulfate 2 on the graphite particle 1 as shown in FIG. 1.

Figure 1:
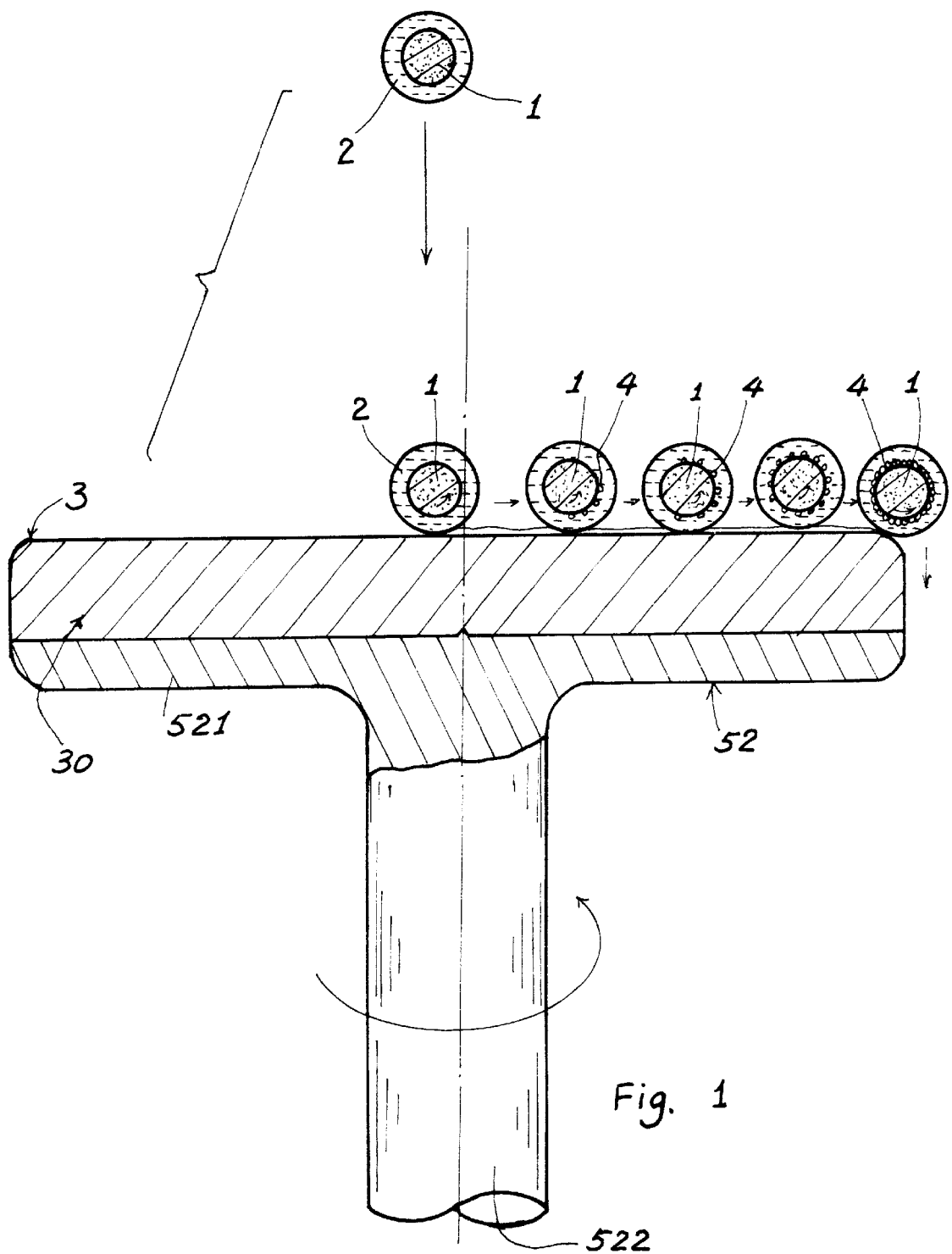
FIG. 1 is an illustration showing the displacement reaction on a rotating metal disk in accordance with the present invention.
Figure 2:
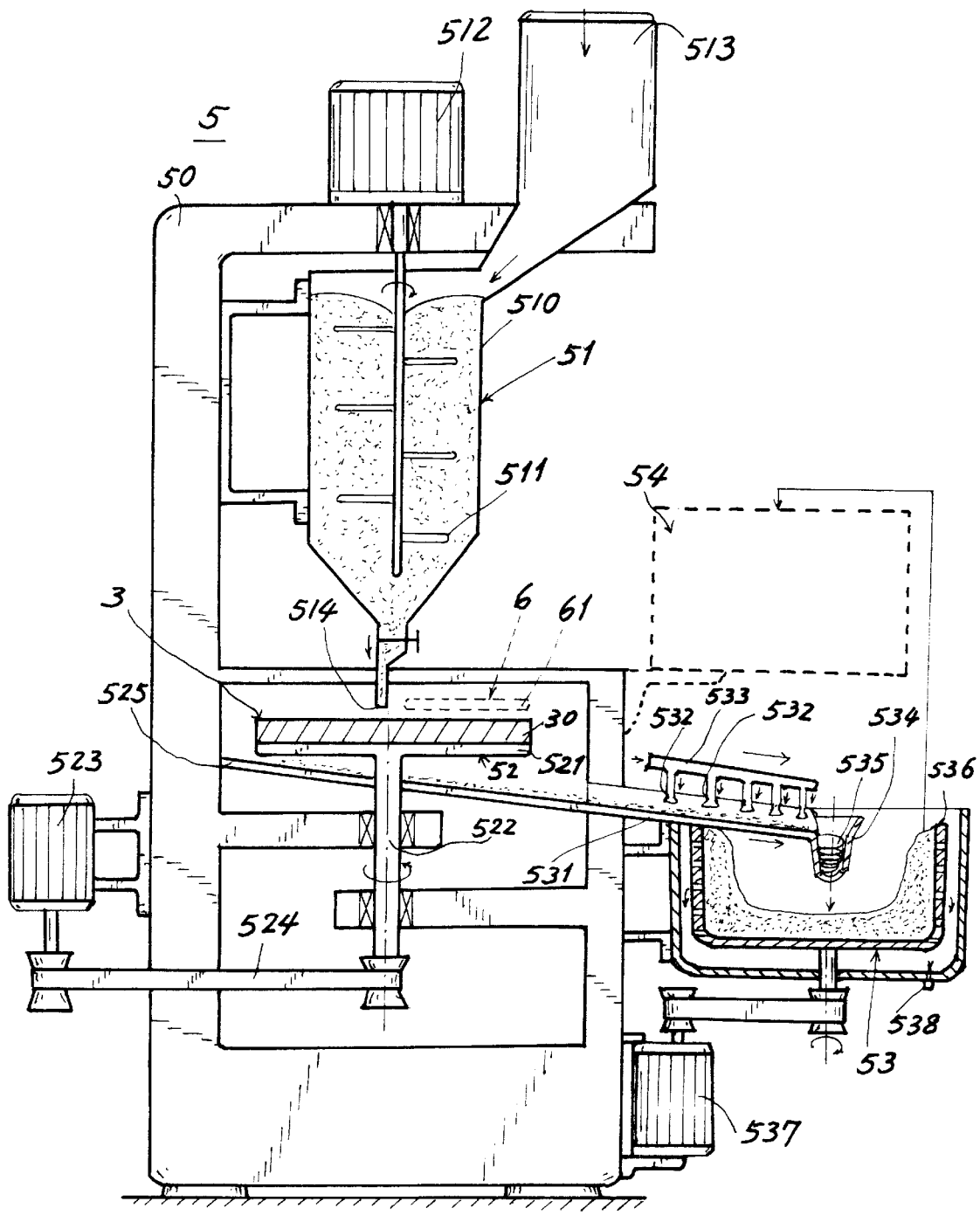
FIG. 2 shows an apparatus for plating copper on the graphite particles in accordance with the present invention.

The mixing proportion of the cupric sulfate solution with the graphite particles is shown as follows:

Aqueous solution of cupric sulfate (volume)/graphite particles (weight)=500 ml/100 g 3. Performing Displacement Reaction for Plating Copper on Particulate Graphite:

The graphite particle 1, as circumferentially wetted with a layer of cupric sulfate solution 2 thereon, is dripped downwardly on a rotating metal disk 30 containing a displacing metal 3 on the metal disk 30 as shown in FIGS. 2 and 1. The apparatus 5 for plating the copper on the graphite as shown in FIG. 2 will be hereinafter described.

The displacing metal 3 has an oxidation potential greater than that of copper, including: zinc, aluminum and iron. The zinc metal is most preferable.

The metal disk 30 is held on a disk holder 521 rotatably driven by a shaft 522 for rotating the metal disk 30 to move, transfer, roll, or rotate each graphite particle 1 as wetted thereon with the cupric sulfate solution 2 on the metal disk 30 to contact the displacing metal (for instance, Zinc) 3 on the metal disk 3 to conduct a displacement reaction as follows:

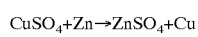

The cupric ion in the cupric sulfate is displaced by the displacing metal, namely, the zinc metal, and the cupric ion 4 is then plated on the graphite 1 (FIG. 1). The copper-plated graphite is then collected from the rotating metal disk 30.

The displacement reaction is conducted within the layer of aqueous solution of cupric sulfate disposed around the graphite particle. That is to say that the copper as displaced by the zinc will be quickly plated on the graphite particle during the contacting movement, transfer, rolling or rotation of the wetted graphite particle on the metal disk 30.

The aqueous solution of cupric sulfate presents as a layer to be "disposed around" the graphite particle, not a big bath, thereby increasing the reactivity of the displacement reaction and increasing the copper plating efficiency on the graphite particles.

The diameter of the rotating metal disk 30, the rotation speed of the metal disk 30 and the dripping rate of the wetted graphite particles onto the disk 30 are the variables possibly influencing the displacement reaction in accordance with the present invention.

As shown in FIG. 3, the graphite particles are moved or rolled on the disk 30 in a path or curvature of cycloidal shape C from the dropping location adjacent to or slightly eccentric to a center of the shaft 522 towards a perimeter of the disk 30. Naturally, other shapes of the moving paths of the graphite particles on the disk 30 may be presented and are not limited in the present invention.

All the graphite particles are gradually driven cycloidally (or spirally or radially) outwardly from near the center of the disk 30 to the perimeter of the disk and then released from the disk to be collected for further treatment.

From near the center of the disk 30 to the perimeter of the disk, each graphite particle will also complete its plating process, namely, being plated with the copper thereon. Therefore, the moving path of the wetted graphite particle from near the center of the disk 30 to the perimeter of the disk 30 is considered as the reaction path of the copper plating on the graphite in accordance with the present invention. Once completing the plating reaction, the copper plated graphite particles are collected from the disk 30 so that the mutual collision among the copper-plated graphite particles to break or peel off the copper plating on the graphite will be minimized or prevented.

During the copper plating reaction, small quantity of copper film or scraps may be deposited on the metal disk 30. The copper film or scraps may be removed by a scraper 60 of a scraping means 6 as shown in FIG. 4 to refresh the metal surface 3 for the displacement reaction.

4. Washing and Drying the Copper-plated Graphite Particles:

The copper-plated graphite particles are washed with distilled water to remove the layer of aqueous solution of zinc sulfate disposed around the copper-plated graphite and other impurities. Then, the washed graphite particles are dehydrated and dried.

Figure 5:
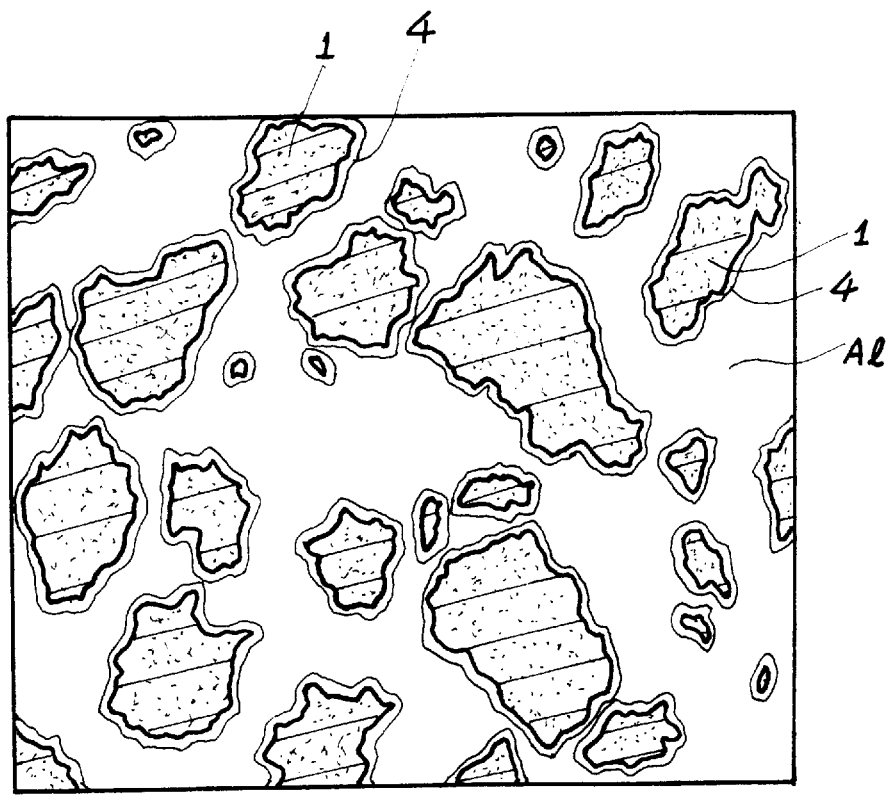
FIG. 5 is an illustration showing a homogenous distribution of the copper-plated graphite particles in an aluminum-matrix composite in accordance with the present invention.

The copper-plated graphite may be added into the aluminum-matrix composite or other materials for forming casting product, power metallurgy product or any other molding products. As shown in FIG. 5 (magnified with 1000 times), the graphite particles 1 each plated with copper 4 are homogeneously distributed in the aluminum-matrix composite in order for improving a self-lubrication and abrasion resistance of a casting product containing the copper-plated graphite.

The present invention is performed under safer reaction conditions, without requiring heat treatment by high-temperature hydrogen. The copper plating reaction is conducted on the rotating metal disk 30, particularly conducted within the layer of cupric sulfate solution disposed around each graphite particle, for increasing the copper plating efficiency on the graphite particles. The high-temperature hydrogen treatment is eliminated to thereby decrease the installation, production and management cost.

As shown in FIG. 2, the apparatus 5 for plating copper on the particulate graphite comprises: a frame or housing 50, a wetting means 51 mounted on the frame 50 for wetting the graphite particles 1 with aqueous solution of cupric sulfate 2, a displacement-reaction disk means 52 secured on the frame 50 under the wetting means 51 for plating copper 4 on the graphite particles 1, a washing means 53 connected with the displacement-reaction disk means 52 for washing the copper-plated graphite particles, and a dryer 54 for drying the washed graphite particles as copper placed. The washing means 53 may be integrally formed with the dryer 54 for continuously washing and drying the copper-plated graphite particles.

The wetting means 51 includes: a tank 510 mounted on the frame 50; an agitator 511 rotatably mounted in the tank 510 and driven by a motor 512; a chute (or hopper) 513 for feeding the aqueous solution of cupric sulfate, the glacial acetic acid and the graphite particles into the tank 510 through the chute 513; and a dripping nozzle 514 formed on a bottom of the tank 510 for dripping the wetted graphite particles downwardly towards the displacement-reaction disk means 52 when rotating the agitator for agitating the aqueous solution of cupric sulfate, the glacial acetic acid and the graphite particles for wetting the aqueous solution of cupric sulfate on the graphite particles.

The displacement-reaction disk means 52 includes: a disk holder 521 for supporting thereon the displacing metal disk 30 containing the displacing metal 3 including zinc, aluminum, iron and other metals having an oxidation potential greater than that of copper; a shaft 522 axially secured under the disk holder 521 and rotatably driven by a driving motor 523 through a transmission device 524 including a transmission belt; and a collector or collecting trough 525 inclinedly positioned under the disk holder 521 and connected with a washing means 53; whereby upon dripping of wetted graphite particles on the displacing metal disk 30 on the disk holder 521 under rotation, the graphite particle wetted with the aqueous solution of cupric sulfate will be movably contacted with the displacing metal 3 on the rotating metal disk 30 held on the disk holder 521 for conducting a displacement reaction on the metal disk for plating copper 4 from the aqueous solution of cupric sulfate on the graphite particle 1 which will be released from the metal disk 30 and collected by the collector 525.

The washing means 53 includes: a sloping trough 531 connected to the collector 525 of the displacement-reaction disk means 52 for receiving the copper-plated graphite particles as discharged from the collector 525, a plurality of spray nozzles 532 respectively connected to a water pipe 533 for spraying distilled water supplied from the water pipe 533 towards the sloping trough 531 for washing the copper-plated graphite particles which will be downwardly discharged through the sloping trough 521, a funnel 534 secured to an end of the sloping trough 531 and formed with spiral sloping groove 535 in the funnel 534 for spirally guiding a streamflow of water for washing the copper-plated graphite particles which are laden in the water downwardly, and a centrifuge 536 under the funnel 534 for collecting the copper-plated graphite particles as washed for removing water from the graphite particles.

The centrifuge 536 is driven by a motor 537 and the water removed by the centrifuge 536 is discharged by a drain pipe 538 formed on a bottom of the centrifuge 536. An agitator (not shown) may be provided in the centrifuge 536 or in the funnel 535 for well mixing of water with the copper-plated graphite particles for efficiently washing the graphite particles.

The copper-plated graphite particles, after being washed, are dried under inert-gas atmosphere by the dryer 54. The dryer 54 may be heated by electricity, gas, oil or other fuels, not limited in this invention.

The displacing metal (or zinc) disk 30, after being used up, may be replaced with a new disk 30 for continuously performing the displacement reaction for plating copper on the graphite.

As shown in FIG. 4, a scraping means is provided for scraping and removing a copper film deposited on the metal disk 30 during the displacement reaction.

The scraping means 6 includes: a scraper 61 made of rubber and other elastomer materials secured to a front portion of a suction hood 62 having a suction port defined between the suction hood 62 and a front cover 63 pivotally secured to a front portion of the suction hood 62, a flexible duct 64 connected between the suction hood 62 and a suction fan 65 for rearwardly sucking copper film or scraps and graphite particles as scraped by the scraper 61, a separator 66 for receiving the copper film or scraps and the graphite particles as sucked by the suction fan 65 and for separating the graphite particles 1 from the copper film or scraps 4 as the copper 4 is heavier than graphite 1 in a suspension liquid 67 in the separator 66, and an elevating device 60 secured to a frame for lifting the scraper 61 upwardly to be separated from the displacing metal disk 30 when not for scraping purpose; or alternatively, for lowering the scraper 61 to approximate the metal disk 30 for sucking the copper film or scraps.

The copper film or scraps as scraped and removed by the scraping means 6 will refresh the surface of the metal disk 30 to form a "fresh" surface of the metal (zinc) 3 for enhancing the displacement reaction.

The front cover 63 may also be opened at the front opening of the suction hood 62 for removing copper film directly from the interior of the hood 62.

The scraping means 6 may also be simplified to be a manually operating scraper adapted for scraping and removing the copper film or scraps as formed on the metal disk 30 during the displacement reaction.

Figure 6:
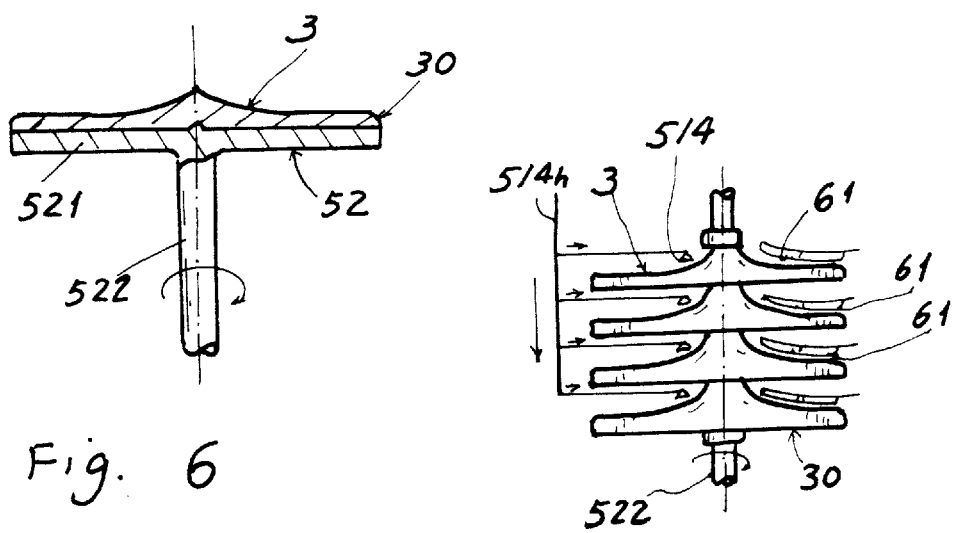
FIG. 6 shows another modification of the rotating metal disk of the present invention.

As shown in FIG. 6, the displacing metal (zinc) disk 30 may be formed as a shallow cone having a small slope slightly sloping downwardly from an apex at a center of the disk 30 for gravitationally descending the copper-plated graphite particles on the metal disk 30 under rotation.

Figure 7:
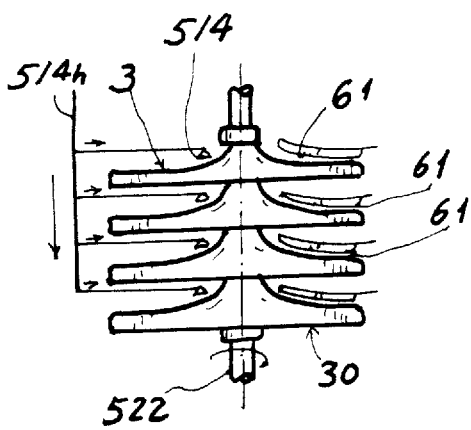
FIG. 7 shows another preferred embodiment of the present invention provided with multiple-layer rotating metal disks.

As shown in FIG. 7, a plurality of displacing metal disks 30 are superimposed to form a plurality of layers of the metal disks 30 axially secured on the shaft 522 of the displacement-reaction disk means 52; and a plurality of dripping nozzles 514 respectively connected to a dripping tube or header 514h connected to the wetting means 51, with each dripping nozzle 514 projecting centripetally to approximate the center of each metal disk 30 for dripping the wetted graphite particles on each metal disk 30, thereby multiplying the capacity of the displacement reaction for mass production of copper-plated graphite particles.

The present invention may be modified without departing from the spirit and scope of the present invention. The aqueous solution of cupric sulfate may be modified to be other plating solutions having copper displaced from the plating solution to be plated on the graphite particle.

We claim:

1. A process for plating copper on particulate graphite comprising the steps of:

A. Cleaning and drying graphite particles;
   B. Wetting the graphite particles with a plating solution containing copper ions;
   C. Dripping the graphite particles as wetted by the plating solution on a rotating displacing metal disk containing displacing metal having an oxidation potential greater than that of copper to have the copper displaced from the plating solution and plated on the graphite particles to form copper-plated graphite particles; and
   D. Washing the copper-plated graphite particles with water and drying the copper-plated graphite particles.

2. A process according to claim 1, wherein said plating solution is an aqueous solution of cupric sulfate.

3. A process according to claim 1, wherein said displacing metal on said displacing metal disk is a zinc metal.

4. A process according to claim 2, wherein said aqueous solution of cupric sulfate is further added with a wetting agent therein.

5. A process according to claim 4, wherein said wetting agent is a glacial acetic acid.

6. A process according to claim 2, wherein said cupric sulfate has a formula of $CuSO_4 \cdot xH_2O$, wherein said x is an integer.

* * * * *